April 20, 1937.  C. K. EDWARDS  2,078,130
CHANGE SPEED CONTROL MECHANISM FOR AUTOMOBILES AND THE LIKE
Filed Sept. 26, 1936   5 Sheets-Sheet 1

Inventor
Charles K. Edwards
per Richard E. Babcock
Attorney.

April 20, 1937.  C. K. EDWARDS  2,078,130
CHANGE SPEED CONTROL MECHANISM FOR AUTOMOBILES AND THE LIKE
Filed Sept. 26, 1936   5 Sheets-Sheet 2
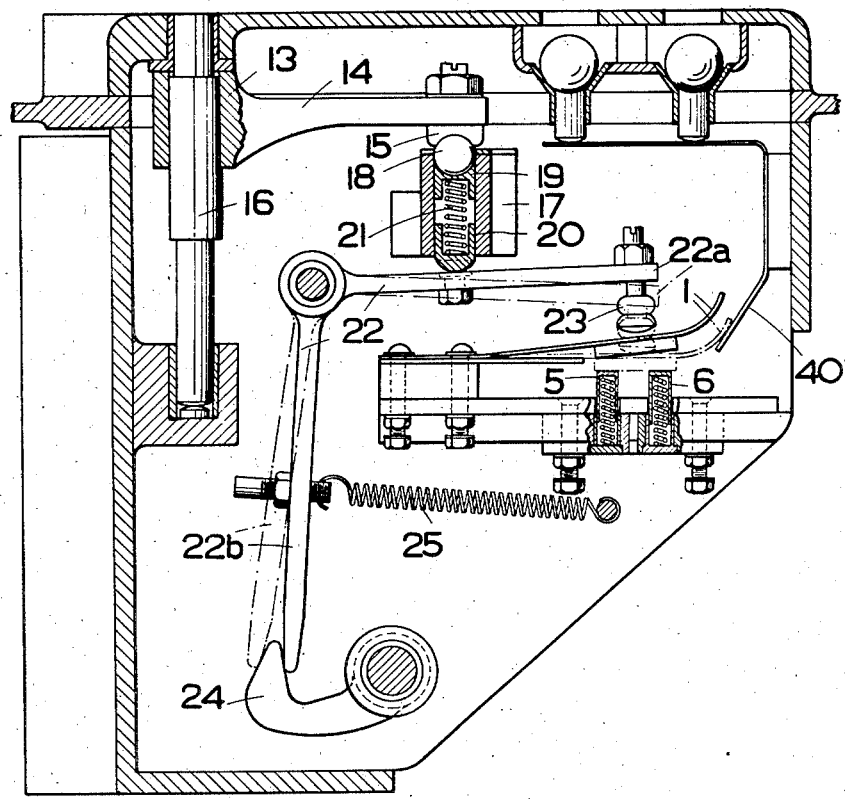
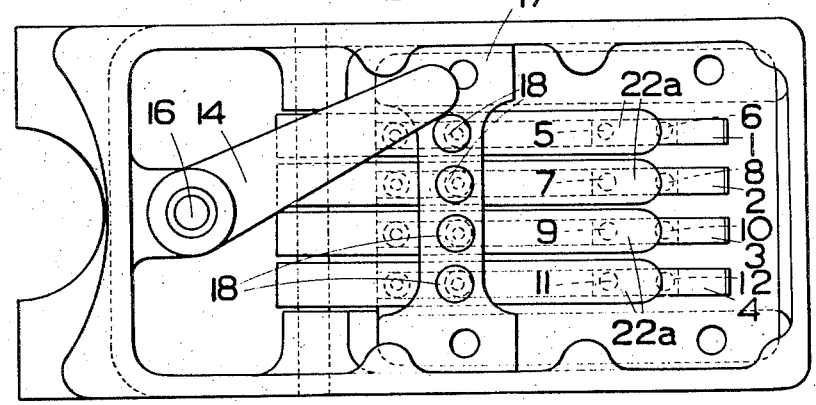
Inventor
Charles K. Edwards
per Richard E. Babcock
Attorney.

April 20, 1937.  C. K. EDWARDS  2,078,130
CHANGE SPEED CONTROL MECHANISM FOR AUTOMOBILES AND THE LIKE
Filed Sept. 26, 1936   5 Sheets-Sheet 3
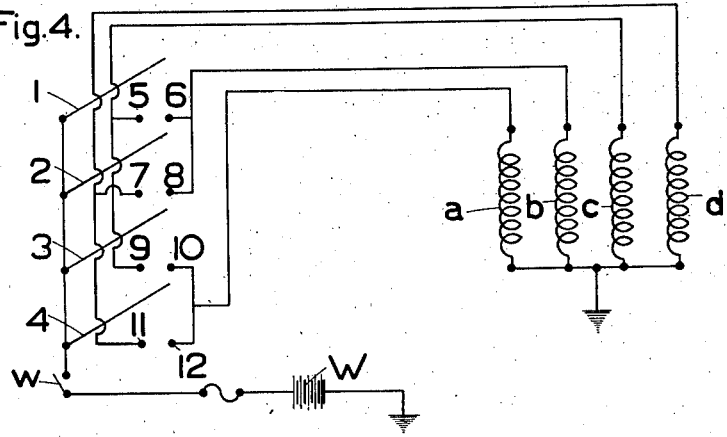
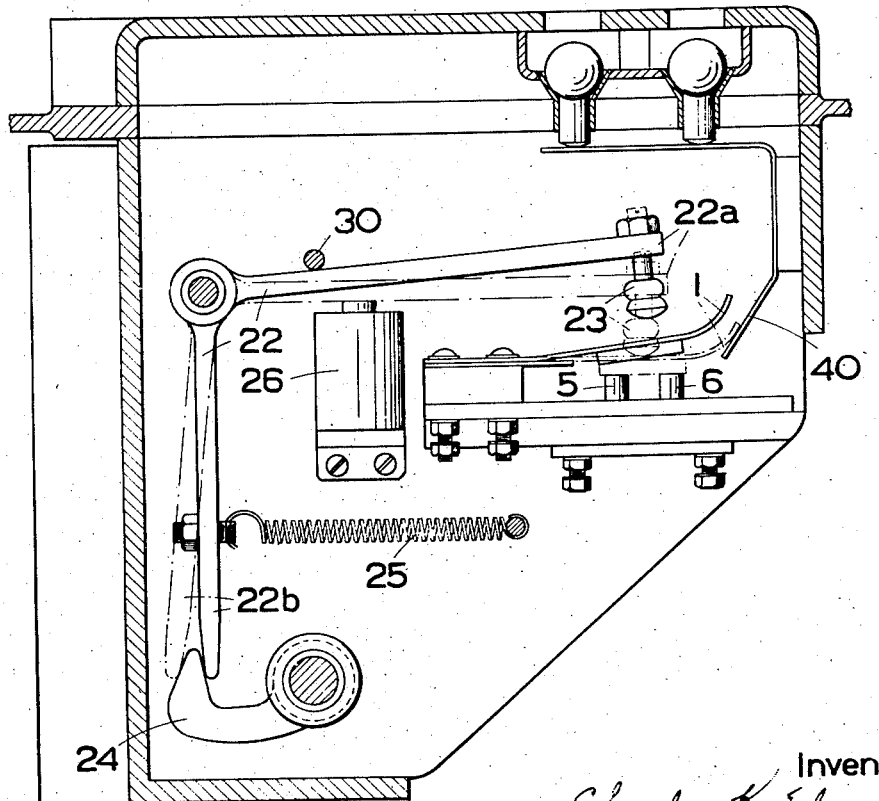
Inventor:
Charles K. Edwards
per
Richard E. Babcock
Attorney.

Charles K. Edwards Inventor per
Richard E. Babcock Attorney

April 20, 1937. C. K. EDWARDS 2,078,130
CHANGE SPEED CONTROL MECHANISM FOR AUTOMOBILES AND THE LIKE
Filed Sept. 26, 1936    5 Sheets-Sheet 5
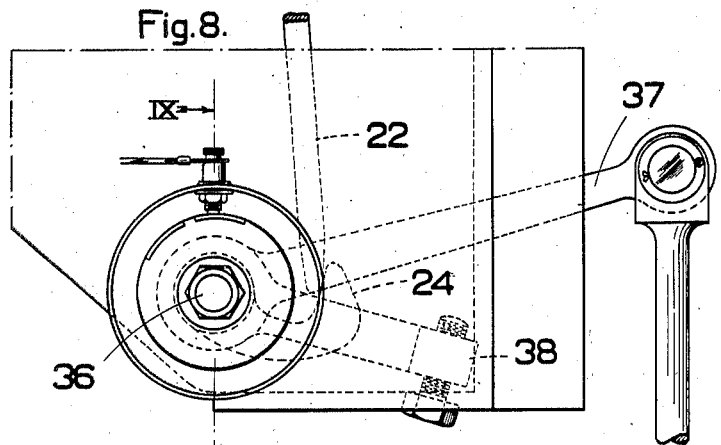
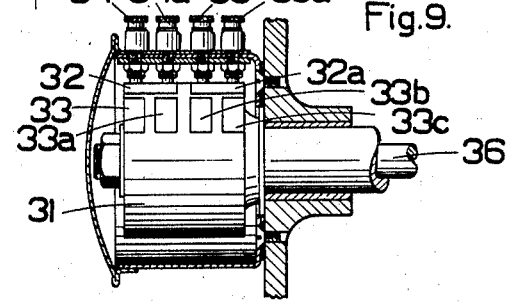
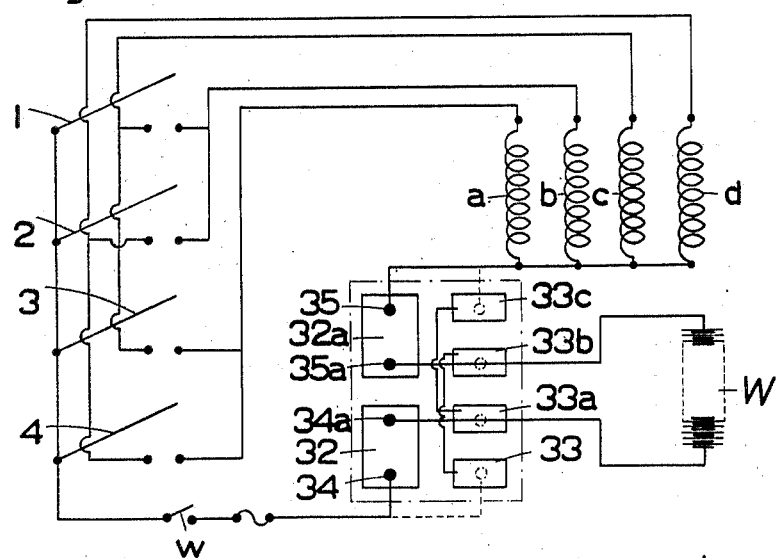
Inventor:
Charles K. Edwards
per
Richard E. Babcock Attorney.

Patented Apr. 20, 1937

2,078,130

UNITED STATES PATENT OFFICE 2,078,130

CHANGE SPEED CONTROL MECHANISM FOR AUTOMOBILES AND THE LIKE

Charles Kearns Edwards, Wolverhampton, England, assignor to Guy Motors Limited, Wolverhampton, England, a British company Application September 26, 1936, Serial No. 102,764
In Great Britain August 19, 1935

8 Claims. (Cl. 74—262)

This invention relates to change speed control mechanism for automobiles and other mechanically propelled vehicles in which the change speed gear box is of the electrically operated type.

In transmission systems including a clutch between a change speed gear of the type referred to and the power unit it is possible as at present arranged for the driver to effect a change of speed without disconnecting the gear from the power unit, the release of the clutch not being a condition precedent to the operation of gear changing. In such cases, however, the electrical clutches in the gear box are necessarily subjected to severe stresses.

An object of the invention is to remedy this defect by making it impossible for the driver to complete a change of gear to a selected speed without having first disconnected the gear box from the engine.

Another object of the invention is to provide that in cases where no clutch or other disconnecting mechanism is provided between the engine and a change speed gear of the kind referred to, a change of gear to a pre-selected speed can only be completed at the will of the driver.

Another object of the invention is to provide improved means for selectively operating the electrical clutches of the gear box.

A further object of the invention is to ensure the certain and quick disengagement of the said electrical clutches when changing from one speed to another.

A still further object of the invention is to adapt change speed control mechanism of the kind herein described for use in conection with a transmission in which a hydraulic clutch of the Föttinger type is employed with or without a pedal operated clutch under the control of the driver.

According to this invention there is associated with a series of selectively operable switches controlling the exciting circuits of a change speed gear of the kind herein referred to, means under the control of the driver for locking and releasing said switches, said means being operative to prevent a pre-selected switch from completing its circuits to effect a change of speed until released for that purpose by the driver.

The method of operating the switch gear may be carried out either mechanically or electrically.

The disengagement of the armatures of the electro-magnets constituting the electrical clutches of the gear box may be accelerated and made positive by the provision of an arrangement whereby at the moment of changing from one speed to another any residual magnetism of the said armatures is neutralized by a temporary reversal in the direction of flow of the current passing through the exciting coil of the electromagnet controlling the gear member which is about to be released.

In the accompanying drawings,

Figure 2 is a sectional view through the selector switch gear illustrating the method of operation in which the withdrawal of the transmission clutch is a condition precedent to changing gear.

Figure 3 is a plan view of the same.

Figure 4 is a wiring diagram of the arrangement shown in Figure 2.

Figure 5 is a view similar to Figure 2 illustrating an alternative method of operating the selector switch gear.

Figure 8 is an elevational view thereof.

Figure 9 is a sectional detail view of the reversing switch.

Figure 10 is a wiring diagram of the selector switch control incorporating the reversing switch.

Throughout the drawings like parts are designated by similar reference characters.

Figure 1:
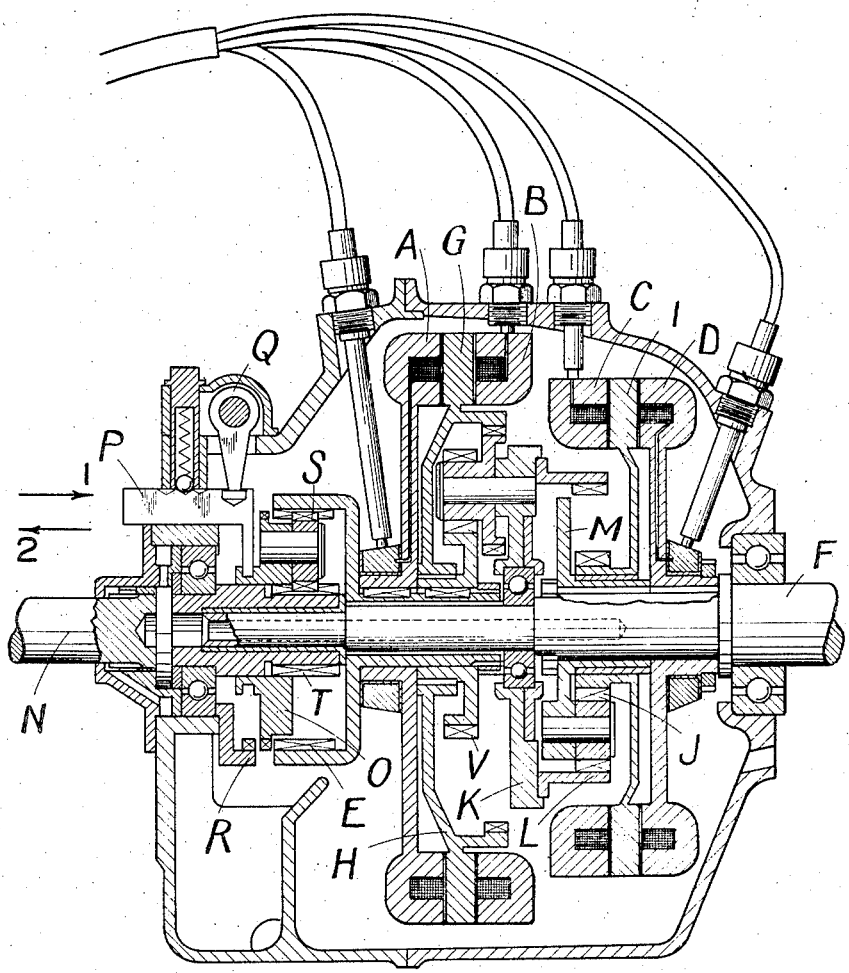
Figure 1 is a sectional view of the type of electrically operated gear box with the operation of which the present invention is more particularly concerned.

Referring to Figure 1, A, B, C, and D are the electro-magnets of a known type of four speed electrically controlled epicyclic gear box, B and C being rigidly fixed to the casing of the box whilst A and D are driven by the input and output shafts N and F respectively. The input shaft N drives the electro-magnet A and the sun-wheel V of the first epicyclic train through the carrier O and the internal gear E. The carrier M of the planetary pinions of the second epicyclic train is keyed to the output shaft F. The outer member H of the first epicyclic train is made integral with a disc G interposed between the faces of the electro-magnets A and B. A similar disc I which carries the sun wheel J of the second epicyclic train is placed between the faces of the electro-magnets C and D. The gear is shown in the neutral position. When carrier O is moved by means of the lever Q and striking fork P in the direction of arrow I its teeth engage with those of the internal gear E and the output shaft F rotates in the same direction as the input shaft N. When, however, the carrier O is moved in the opposite direction from the neutral position its teeth engage with a fixed quadrant R attached to the gear box casing and shaft F then rotates in the opposite direction to shaft N.

The operation of the gear is as follows,—First speed. Both of the fixed magnets B and and C are energized causing discs G and I with their gear elements H and J to be held stationary and thereby give double reduction between shafts N and F. Second speed. Fixed magnets B and revolving magnet D are energized, the first epicyclic train remaining in gear and the second train locked solid. Third speed. The moving magnet A and fixed magnet C are energized locking the first epicyclic train and giving a reduction on the second train. Fourth speed. Both moving magnets A and D are energized locking both epicyclic trains solid and thus giving a direct drive between the input and output shafts N and F.

The method of selectively energizing the exciting coils of the electro-magnets is represented diagrammatically in Figure 4, in which 1, 2, 3, and 4 represent a series of four contact fingers connected in parallel with one pole of a battery W through a switch w. Each contact finger is adapted to be selectively operated by means of a pre-selector speed control lever (not shown) to bridge a pair of fixed contacts connected with the exciting coils a, b, c, d of the four electro-magnets. In the arrangement shown the first speed is obtained by depressing the contact finger 1 to bridge the fixed contacts 5 and 6, thereby completing the circuits of the exciting coils b and c of the electromagnets B and C. For the second speed, contact finger 1 is released and contact finger 2 is depressed so as to bridge the fixed contacts 7 and 8 to complete the circuits of the exciting coils b and d of electro-magnets B and D. For the third speed contact finger 2 is released and contact finger 3 is depressed so as to bridge the fixed contacts 9 and 10 to complete the circuits of the exciting coils a and c of electro-magnets A and C. For the fourth speed contact finger 3 is released and 4 is depressed to bridge the fixed contacts 11 and 12 to complete the circuits of the exciting coils a and d of electro-magnets A and D.

According to the present invention the electrical switch gear is arranged in such a manner that the driver's action in selecting an alternative gear does not actually change the electrical contacts which effect the gear change itself until the driver has disconnected the power unit from the gear box. The action of withdrawing the transmission clutch releases the switch mechanism which instantly assumes the pre-selected position and so changes to the alternative gear ratio required by the driver; this action of actual gear changing taking place whilst the power unit is disconnected from the gear box and thus under conditions in which no shock can can be imparted to the latter.

One arrangement for this purpose is shown in Figures 2 and 3 in which the pre-selector control lever 13 is shown as provided with a selecting arm 14 having a cam 15 at its free end. This arm can swing about a vertical pivot 16 into any one of six different angular positions, one for each speed and two neutral positions. The cam is adapted to make contact with and depress any one of four ball and plunger assemblies carried by a fixed bar 17 bridging the selector switch box and each comprising a ball 18 and two plungers 19 and 20 having a compression spring 21 between them.

Arranged between each plunger assembly and each of the four contact fingers is one arm 22ª of a selector lever 22 having a fibre pad 23 at its free end. Each contact finger 1-4 is electrically connected with one pole of the battery R and is adapted, as aforesaid, to bridge a pair of fixed contacts 5 and 6—11 and 12 electrically connected with one pair or another of the exciting coils a, b, c, d of the electro-magnets. The other arm of each selector lever 22ᵇ is adapted to be locked by means of a locking arm 24 connected and moving with the pedal of the transmission clutch. Normally the selector levers 22 are held in their inoperative positions with their arms 22ª in contact with the plungers 20 by means of tension springs 25. Assuming one of the speeds to be in use the acting selector lever 22 will be locked with the associated contact finger in contact with its pair of fixed contacts to complete the circuit for that speed by its associated locking arm 24 against the pull of its return spring 25. This position of the parts is indicated in dotted lines in Figure 2. The position of each of the other fingers and levers is represented in full lines. When it is desired to pre-select an alternative speed the pre-selector control lever is moved about its pivot to a position in which the cam 15 on the selector arm 14 depresses the plunger assembly appropriate for the pre-selected speed. This spring loads the associated selector lever 22 which, however, cannot move because it is held by the locking arm 24.

When the pre-selected speed is required the driver depresses the clutch pedal to disconnect the gear box from the engine. This releases all the selector levers 22 by removing the locking arms 24 from engagement therewith, the result being that the selector lever previously in operation returns to its inoperative position under the pull of its return spring 25, whilst at the same time the pre-selected spring loaded lever is forced by the plunger 20 into the operative position shown in dotted lines to complete the circuits of the exciting coils of the electro-magnets controlling the pre-selected speed. The change of speed therefore takes place whilst the gear box is disconnected from the engine so that no undue stresses are imposed on the electrical clutches or the transmission. It will be understood that the plunger springs 21 are strong enough to overcome the pull of the return springs 25. When the clutch pedal is released and the gear box again connected with the engine, the locking arms 24 return to their operative position to lock the acting selector lever in its operative position and the other three selector levers in their inoperative position until another change of speed is required.

Figure 6:
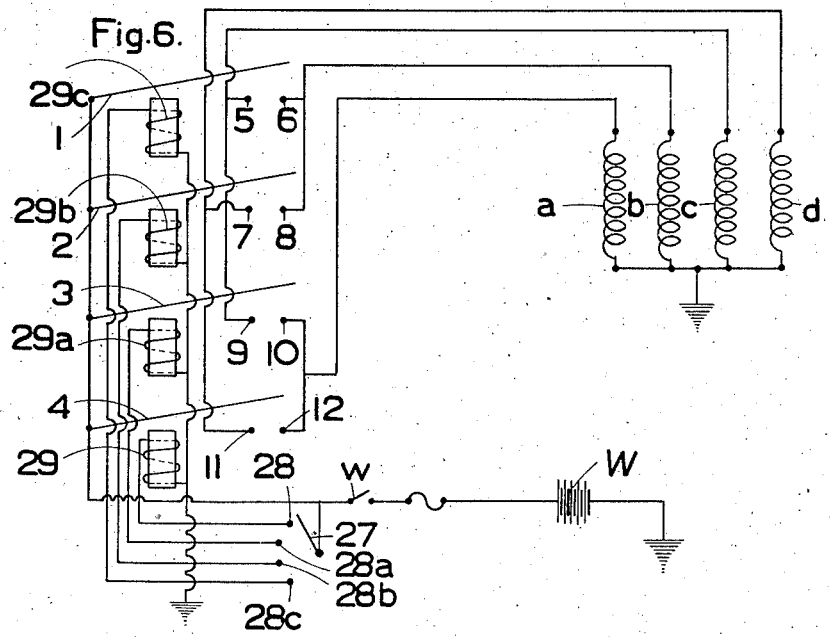
Figure 6 is a wiring diagram thereof.
Figure 7:
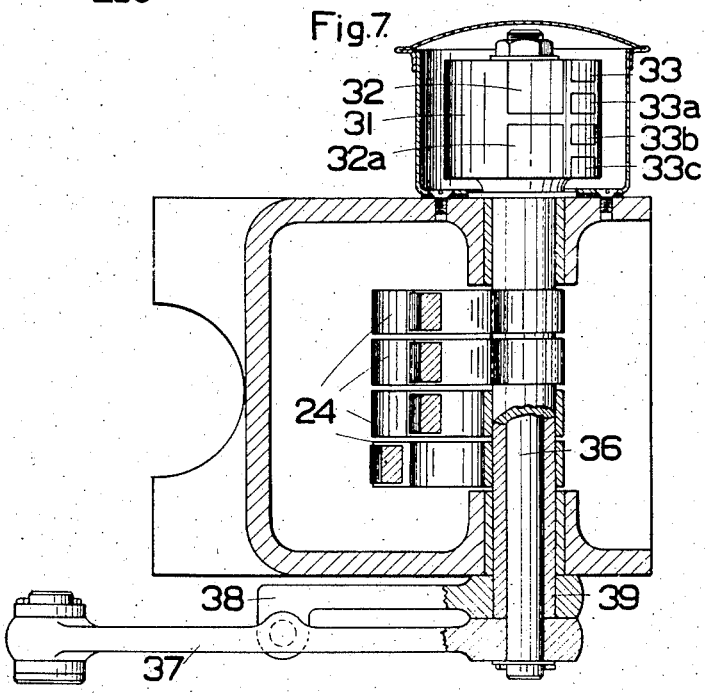
Figure 7 is a part sectional plan view of means for reversing the direction of flow of current to the exciting coil of whichever of the electrical clutches is about to be disengaged when changing gear.

Figures 5 and 6 illustrate an alternative method of operating the selector levers, the mechanical method above described being substituted by an electrical arrangement in which each of the said levers is subject to the action of a solenoid 26 the excitation of which is controlled by means of a pre-selector switch arm 27 connected with one pole of the battery W and with the contact fingers and movable over a series of four fixed contacts 28, 28ª, 28ᵇ, and 28ᶜ respectively connected with the solenoid windings 29, 29ª, 29ᵇ, and 29ᶜ. In other respects the arrangement of the pre-selector switch gear is the same as that above described, the movement of the pre-selector switch arm 27 into contact with one of the fixed contacts 28 causing one of the solenoids to be excited and to exert a magnetic pull on the selector lever 22 associated therewith so that when, on depressing the clutch pedal, this lever is released from engagement with its locking arm 24 it is free to be pulled into its operative position by the solenoid to complete the circuit governing pre-selected gear, the selector lever previously in use being at the same time released and returned to its inoperative position by its return spring 25. The release of the clutch pedal restores the locking arms 24 to their operative positions to retain the acting selector lever in its operative position and to lock the other selector levers in their inoperative position against a stop 30.

In order to ensure certain and quick disengagement of the electro-magnets from their co-operating discs or armatures when changing from one speed to another means may be provided to neutralize any residual magnetism there may be by causing a temporary reversal of the direction of flow of the current to the exciting coils of the pair of electro-magnets which for the time being are in active operation.

The arrangement is shown in Figures 7, 8, 9, and 10 and involves the use of a reversing switch with means whereby at the proper time the said switch is operated to momentarily cross-connect the battery terminals with the circuits of the exciting coils of the acting electro-magnets.

The said switch is preferably of the rotary type comprising a drum 31 carrying, in the case of a four speed gear box, six insulated contact bars arranged in two parallel longitudinal series at a suitable circumferential distance apart. One series consists of two separate axially aligned bars 32, 32ª and the other of a series of four separate axially aligned bars 33, 33ª, 33ᵇ, and 33ᶜ. One bar 32 of the first series is normally connected by means of a pair of fixed contacts 34, 34ª with the four contact fingers 1, 2, 3, 4 of the pre-selector switch gear and with one pole of the battery W respectively, whilst the other bar 32ª is normally connected by a second pair of fixed contacts 35, 35ª with the four exciting coils a, b, c, d of the electro-magnets A, B, C, and D and with the other pole of the said battery respectively.

The series of four contact bars 33, 33ª, 33ᵇ, 33ᶜ are permanently cross-connected in pairs, the arrangement being such that when the drum 31 is rotated to a position in which the four fixed contacts 34, 34ª, 35, 35ª make contact with these four cross-connected contact bars respectively, the effect produced is to reverse the direction of flow of the current passing to whichever pair of the electro-magnets A, B, C, D is for the time being in operation.

The said drum is fixed to a spindle 36 carrying an arm 37 which is connected with the transmission clutch pedal (not shown) and is adapted after the initial withdrawal movement of said clutch to depress a second arm 38 fixed to a tubular shaft 39 surrounding the said spindle 36 and carrying a series of four locking arms 24, one for each of the four selector levers 22 aforesaid.

The operation of the reversing switch is as follows,—When the transmission clutch pedal is depressed to disconnect the engine from the gear box and to effect a change of gear, the first part of the movement of said pedal rotates the drum 31 to a position in which the four cross-connected contact bars 33, 33ª, 33ᵇ, 33ᶜ severally make contact with the four fixed contacts 34, 34ª, 35, 35ª. This reverses the direction of flow of the current passing through the exciting coils of whichever pair of electro-magnets is for the time being in operation. The completion of the clutch withdrawal movement causes the arm 37 on the spindle 36 to depress the arm 38 on the shaft 39 thereby moving the locking arms 24 thereon out of engagement with the selector levers 22 and allowing the selector lever, previously effective in completing the circuit of the gear about to be changed to be released, and at the same time allowing the selector lever previously selected to complete the circuit of the pre-selected gear.

On the return movement of the clutch pedal the locking arms 24 are restored to their operative position to lock the selected lever in its operative position and to lock the other three selector levers in their inoperative position until such time as a further change of gear is required. At the same time the return movement of the reversing switch drum 31 brings the two contact bars 32, 32ª again in contact with the fixed contacts 34, 34ª and 35, 35ª respectively thereby restoring the direction of flow of the current back to normal.

Where the system of variable speed transmission includes a hydraulic clutch of the Föttinger type between the engine and the gear box and there is no provision for disconnecting the drive from the engine, an actual gear change to a pre-selected speed may be made dependent upon the operation of a separate lever, pedal or push button to effect the locking and release of the selector levers or otherwise to break the circuits of the electro-magnets controlling the gear in use and to make the circuits of the electro-magnets for the pre-selected gear. The said lever, pedal or push-button may also at the same time effect a temporary reversal in the direction of flow of the current passing through the exciting coils of the electro-magnets controlling the gear about to be changed.

When a particular contact finger makes contact with the fixed contacts 28ª⁻ᵈ of the selector switch gear it may be arranged, as shown in Figures 2 and 5, to make contact with a plate 40 forming part of the circuit of a lamp so as to complete the said circuit and thereby give a visible indication of the speed which is actually in use as distinct from the pre-selected speed. The said lamps may be arranged in a panel in view of the driver, each lamp being marked to signify the particular speed with which it is associated or the different speeds may be indicated by lamps of different colors.

I claim:—

1. Control mechanism for change speed gears of the class described comprising a plurality of electro-magnetic clutches for controlling the changes of speed, a source of electric energy for energizing the exciting coils of said magnets, a series of switches for controlling the circuits of said exciting coils, a lever having a plurality of positions for pre-selecting any one of said switches and means under the control of the operator whereby any one of said switches which has been pre-selected is prevented from closing its circuits and the acting switch from opening its circuits while the gear is in effective operation.

2. Control mechanism for change speed gears of the class described comprising a plurality of electro-magnetic clutches for controlling the changes of speed, a source of electric energy for energizing the exciting coils of said magnets, a series of switches for controlling the circuits of said exciting coils, a lever for pre-selecting any one of said switches, switch locking means, means adapted for selective operation for loading any one of said switches against the action of said switch locking means, and means under the control of the operator for releasing said switch locking means to allow said loaded switch to close its circuits when the gear is disengaged.

3. In control mechanism for change speed gears of the class described the combination with clutch operating means for connecting and disconnecting the gear with and from a source of power, and with a series of pre-selectively operable switches controlling the exciting circuits of said gear of means for pre-selecting and loading any one of said switches, means for locking a pre-selected loaded switch out of its operative position, and means associated with said clutch operating means for releasing said switch locking means to allow said loaded switch to close its circuits when the said clutch operating means has been actuated to disengage the gear from the source of power.

4. Control mechanism for change speed gears of the class described, comprising a plurality of electro-magnetic clutches for controlling the changes of speed, a source of electric energy for energizing the exciting coils of said magnets, a series of switches for controlling the circuits of said coils, means for selectively operating said switches, means whereby the direction of current flowing through the exciting circuit of the acting electro-magnet is automatically reversed immediately prior to a change of speed, and means under the control of the operator whereby any one of said switches which has been pre-selected is prevented from closing its circuits while the gear is in active operation.

5. In control mechanism for change speed gears of the class described, the combination with a clutch for connecting and disconnecting the gear with and from a source of power, and with a series of pre-selectively operable switches controlling the exciting circuits of said gear, of switch locking means adapted to prevent any one of said switches which has been pre-selected from closing its circuits, a lever for operating said clutch and means associated with said lever for releasing said switch locking means during the disengagement of said clutch.

6. Change speed gear comprising input and output shafts, a plurality of gear trains arranged between said shafts, electro-magnetic clutches associated with said gear trains for varying the relative speeds of the said shafts, a source of electric energy for energizing the exciting coils of said electro-magnets, a series of pre-selectively operable switches for controlling the circuits of said exciting coils, and means under the control of the operator whereby any one of said switches which has been pre-selected is prevented from closing its circuits and the acting switch from opening its circuits while the gear is in effective operation.

7. In control mechanism for change speed gears of the class described, the combination with the exciting circuits of a plurality of electro-magnets controlling the changes of speed, of a series of pre-selectively operable switches governing said circuits, control means for preventing the pre-selected switch from closing its circuits and the acting switch from opening its circuits and operable to release the pre-selected switch to close and the acting switch to open, neutralizing means for automatically reversing the exciting circuits of the acting electro-magnets, and means constituting an interlock between said control means and said neutralizing means whereby when said control means is operated to release the pre-selected switch to close and the acting switch to open the exciting circuits of the acting electro-magnets will be reversed immediately prior to a change of speed.

8. In control mechanism for change speed gears of the class described the combination with clutch operating means for connecting and disconnecting the gear with and from a source of power, and with the exciting circuits of a plurality of electro-magnets controlling the changes of speed, a current reversing switch and means associated with said clutch operating means for operating said switch to reverse the direction of current flowing through the exciting circuits of the acting electro-magnets immediately prior to a change of speed.

CHARLES KEARNS EDWARDS.